United States Patent
Kumaraguru et al.

(10) Patent No.: US 10,784,527 B2
(45) Date of Patent: Sep. 22, 2020

(54) SYSTEM AND METHOD FOR MEA CONDITIONING IN A FUEL CELL

(71) Applicant: GM Global Technology Operations LLC, Detroit, MI (US)

(72) Inventors: Swaminatha P. Kumaraguru, Rochester Hills, MI (US); Jingxin Zhang, Novi, MI (US); Nagappan Ramaswamy, Rochester Hills, MI (US); Pinkhas A. Rapaport, Penfield, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 318 days.

(21) Appl. No.: 15/846,777

(22) Filed: Dec. 19, 2017

(65) Prior Publication Data
US 2019/0190040 A1 Jun. 20, 2019

(51) Int. Cl.
| | |
|---|---|
| H01M 8/04828 | (2016.01) |
| H01M 8/04119 | (2016.01) |
| H01M 8/1004 | (2016.01) |
| H01M 8/04537 | (2016.01) |
| H01M 8/04858 | (2016.01) |
| H01M 8/04223 | (2016.01) |
| H01M 8/0432 | (2016.01) |

(Continued)

(52) U.S. Cl.
CPC ......... *H01M 8/0485* (2013.01); *H01M 8/043* (2016.02); *H01M 8/0488* (2013.01); *H01M 8/0491* (2013.01); *H01M 8/04126* (2013.01); *H01M 8/04223* (2013.01); *H01M 8/04358* (2013.01); *H01M 8/04544* (2013.01); *H01M 8/04559* (2013.01); *H01M 8/04589* (2013.01); *H01M 8/04835* (2013.01); *H01M 8/1004* (2013.01); *H01M 2008/1095* (2013.01); *H01M 2250/20* (2013.01)

(58) Field of Classification Search
CPC ......... H01M 2250/20; H01M 8/04126; H01M 8/04544; H01M 8/0485; H01M 8/1004
See application file for complete search history.

(56) References Cited

U.S. PATENT DOCUMENTS

| | | |
|---|---|---|
| 9,099,703 B2 | 8/2015 | Rapaport et al. |
| 2007/0042243 A1* | 2/2007 | Bai .................. H01M 8/04119 320/101 |

(Continued)

*Primary Examiner* — Adam A Arciero
(74) *Attorney, Agent, or Firm* — Quinn IP Law

(57) ABSTRACT

A controller-executed method for conditioning a membrane electrode assembly (MEA) in a fuel cell for use in a fuel cell stack includes humidifying a fuel inlet to the stack to a threshold relative humidity level, and maintaining a current density and cell voltage of the fuel cell at a calibrated current density level and hold voltage level, respectively, via the controller in at least one voltage recovery stage. The recovery stage has a predetermined voltage recovery duration. The method includes measuring the cell voltage after completing the predetermined voltage recovery duration, and executing a control action with respect to the fuel cell or fuel cell stack responsive to the measured cell voltage exceeding a target voltage, including recording a diagnostic code via the controller indicative of successful conditioning of the MEA. A fuel cell system includes the fuel cell stack and controller.

20 Claims, 3 Drawing Sheets

(51) Int. Cl.
H01M 8/043 (2016.01)
H01M 8/1018 (2016.01)

(56) References Cited

U.S. PATENT DOCUMENTS

2009/0253001 A1* 10/2009 Ito .......................... B60L 50/72
429/412
2012/0305430 A1* 12/2012 Jaeger ............... H01M 8/04201
206/459.1
2013/0260266 A1* 10/2013 Rapaport .......... H01M 8/04365
429/410

* cited by examiner

SYSTEM AND METHOD FOR MEA CONDITIONING IN A FUEL CELL

INTRODUCTION

Fuel cell stacks are energy conversion devices in which electricity is generated via a controlled electrochemical reaction between hydrogen and oxygen. A given fuel cell may produce up to 1 volt of electricity, and therefore a large number of identically-configured fuel cells are assembled together to form the stack, with the number of fuel cells and the particular fuel cell configuration ultimately determining the stack's power capability. Polymer electrolyte membrane/proton exchange membrane (PEM) fuel cells are a specific type of fuel cell used for producing electricity in high-power applications such as power supplies used in vehicles, power plants, and buildings. A membrane electrode assembly (MEA) is a core component of the PEM fuel cell.

Within the MEA of a PEM fuel cell, opposing anode and cathode electrodes are separated by a polymeric electrolyte material. Gaseous hydrogen is fed at a controlled rate through flow plates to the anode while oxygen, commonly supplied via an air compressor, is fed through flow plates to the cathode. Hydrogen present at the anode is catalytically split into hydrogen protons (positive hydrogen ions) and free electrons. The protons pass through the polymer electrolyte to the cathode while the free electrons are conducted through an external circuit to the cathode. That is, the free electrons form an electric current that passes to the cathode via an external circuit, with the electric current available to perform useful work within a system employing the fuel cell stack. Upon reaching the cathode, the electrons recombine with the protons and oxygen molecules to form water as an inert reaction byproduct.

PEM fuel cell stacks employing MEAs in a typical hydrogen-fueled catalytic process require an adequate supply of hydrogen gas and oxygen to the respective anode and cathode electrodes of each fuel cell, as well as proper hydration, in order to ensure that ionic conductivity across the MEA allows the protons to pass there through with low resistance. However, MEAs are largely devoid of moisture in newly-constructed fuel cells, and thus lack the requisite ionic conductivity. A break-in/conditioning process is therefore used in newly-fabricated PEM fuel cells or stacks to optimize initial power performance. An MEA conditioning process serves three main functions: humidification, removal of residual solvents and impurities from the fuel cell manufacturing process, and removal of negatively-charged ions (anions) from the catalyst surface used to conduct the electrochemical reactions in the electrodes.

SUMMARY

A method and system are disclosed herein for conditioning a membrane electrode assembly (MEA) in a proton exchange membrane (PEM) fuel cell. As noted above, MEAs used in PEM fuel cells, and fuel cell stacks constructed from such cells, require an initial break-in or conditioning process when first assembled. Conditioning may be provided by a load cycling process, i.e., cycling of current density of the fuel cell, until a plateau performance is achieved in the cell voltage. However, conditioning solely to such a plateau performance may not represent the peak initial power performance of a given MEA or its associated fuel cell. The present approach is therefore intended to provide a more effective and comparatively faster-acting way to bring a newly-constructed MEA-containing fuel cell to its peak power performance and efficiency.

In an example embodiment, a method for conditioning an MEA in a fuel cell for use in a fuel cell stack includes humidifying a fuel inlet to the fuel cell stack to a threshold relative humidity level, e.g., at least 95 percent or over 100 percent. A controller maintains a current density and a cell voltage of the fuel cell at a calibrated current density level and a calibrated hold voltage level, respectively, in one or more voltage recovery stages each having respective predetermined voltage recovery durations. The method includes measuring the cell voltage via a voltage sensor after completing the predetermined voltage recovery duration, and then executing a control action with respect to the fuel cell or fuel cell stack responsive to the measured cell voltage exceeding a target voltage. The control action may include recording a diagnostic code via the controller indicative of successful conditioning of the MEA.

In some embodiments, the calibrated current density level may be in a range of 0.3 to 1 $A/cm^2$ and the calibrated hold voltage level is in a range of 0 to 0.4 volts. The voltage recovery duration may be over 10 minutes, e.g., 10-30 minutes, whether in a single continuous step of such a duration or in multiple such steps.

Prior to the voltage recovery stage(s), the method may include executing an optional load cycling stage in which the current density level is cycled within a calibrated current density range having a lower limit and an upper limit that exceeds the current density level used during the at least one voltage recovery stage.

In an embodiment, the lower limit may be at least twice the current density level used during the voltage recovery stage(s). The current density level used during the voltage recovery stage(s) may be about 0.6 $A/cm^2$, with the lower limit of the load cycling stage being about 1.5 $A/cm^2$, and the upper limit being about 2 $A/cm^2$.

Each voltage recovery stage may be conducted at a temperature range of ambient to about 50° C. Or, a temperature of at least about 80° C. may be used, in which case the method includes supplying hydrogen to an anode of the fuel cell, supplying nitrogen to a cathode of the fuel cell, and then maintaining the calibrated hold voltage level to about 0 to 0.2 V.

A fuel cell system is also disclosed that includes a fuel cell stack having a plurality of fuel cells each having an MEA, and a controller having memory on or in which is recorded instructions for breaking-in or conditioning the MEAs of the respective fuel cells. Execution of the instructions causes the controller to execute the above-described method.

The above-noted features and advantages and other features and advantages of the present disclosure are readily apparent from the following detailed description of the best modes for carrying out the disclosure when taken in connection with the accompanying drawings.

Figure 1:
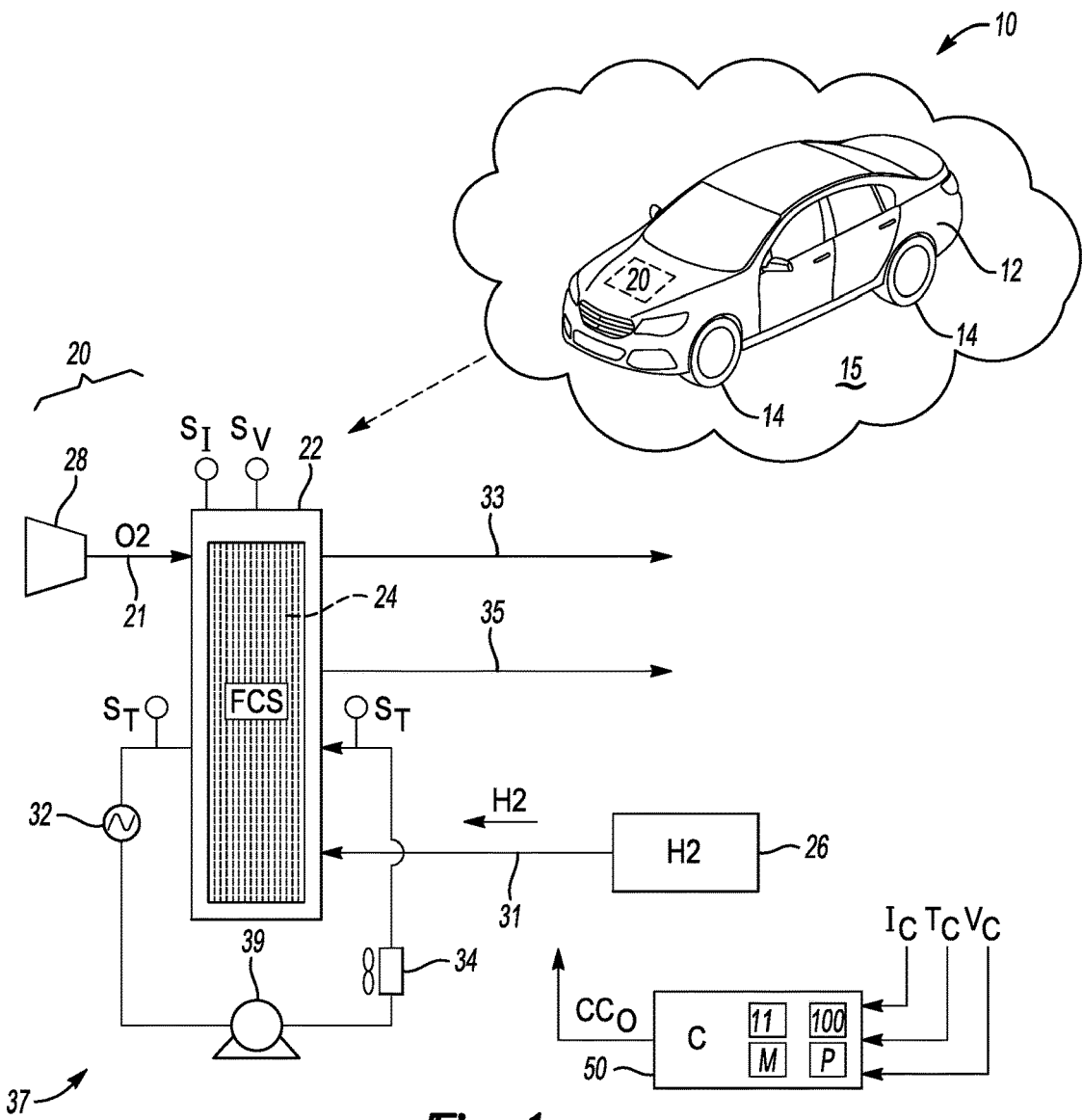
FIG. 1 is a schematic block diagram of an example polymer electrolyte membrane/proton exchange membrane (PEM) fuel cell system according to the present disclosure.

The present disclosure is susceptible to various modifications and alternative forms, and some representative embodiments have been shown by way of example in the drawings and will be described in detail herein. Novel aspects of this disclosure are not limited to the particular forms illustrated in the appended drawings. Rather, the disclosure is intended to cover modifications, equivalents, combinations, and other alternatives falling within the scope of the disclosure as defined by the appended claims. Additionally, words of approximation used herein, such as "about," "substantially," "approximately," and the like, may be used herein in the sense of "at, near, or nearly at," "within 0-5% of," "within acceptable manufacturing tolerances," or other logical combinations thereof.

DETAILED DESCRIPTION

Referring to the drawings, wherein like reference numbers refer to the same or like components in the several Figures, a polymer electrolyte membrane/proton exchange membrane (PEM) fuel cell system 20 is depicted schematically in FIG. 1 as having a fuel cell stack (FCS) 22 constructed of a plurality of fuel cells 24. The PEM fuel cell system 20 may be used to generate electrical power for use in a host of beneficial applications. For instance, the PEM fuel cell system 20 may be used for onboard power generation in the illustrated motor vehicle 10. The vehicle 10 of FIG. 1 may include a body 12 mounted to a set of drive wheels 14 that are in rolling frictional contact with a road surface 15. The fuel cell stack 22 may be used in such a vehicle 10 could power a motor used to rotate the drive wheels 14 and/or power other onboard systems. Vehicles other than the motor vehicle 10 may benefit from the use such a fuel cell stack 22, e.g., rail vehicles or trains, aerospace vehicles, or marine vessels. Likewise, non-vehicular applications may be readily envisioned such as power plants, mobile platforms, robotic systems, or lighting systems, and therefore the illustrated motor vehicle 10 is a non-limiting representative embodiment.

The individual fuel cells 24 of the fuel cell stack 22 are, as explained above, conditioned or broken-in when newly constructed. This process may be regulated by a controller (C) 50 and an associated controller-executed method 100, an example of which is described below with reference to FIGS. 2-4.

As part of the method 100, a multi-stage voltage recovery process is executed offline or online, either by itself or in conjunction with the above-noted load/current cycling process, in order to initially break-in or condition the fuel cells 24. In some embodiments, the method 100 may be executed shortly after installation of the fuel cell stack 22 into the vehicle 10 or other system. A hydrogen/nitrogen ($H_2/N_2$) low-voltage hold process may be optionally used to conduct the disclosed voltage recovery process, with this alternative embodiment detailed separately below. The controller 50 may execute a suitable control action responsive to execution of the method 100, such as recording a diagnostic code in memory (M) or elsewhere that is indicative of successful conditioning. Other possible control actions include precluding commissioning or preventing use of the fuel cell stack 22 in the system, e.g., the vehicle 10 of FIG. 1, until the fuel cells 24 have successfully completed the conditioning process according to the method 100.

Figure 1A:
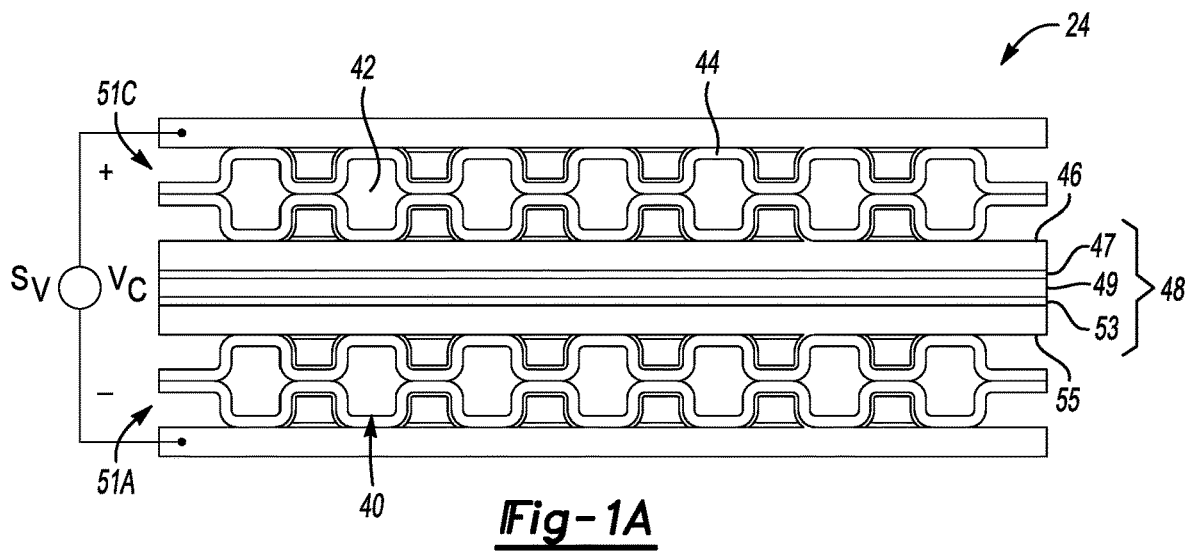
FIG. 1A is a cross-sectional view of an example fuel cell usable within the PEM fuel cell system depicted in FIG. 1.

Referring briefly to FIG. 1A, a representative one of the fuel cells 24 of FIG. 1 includes electrodes in the form of a cathode 51C and an anode 51A separated by a thin membrane 49, e.g., a perfluorosulfonic acid (PFSA) membrane. As is known in the art, such a membrane functions as a separator and solid electrolyte material that selectively transports hydrogen protons/cations as noted above. A cathode-side diffusion media layer 46 is provided on the cathode 51C, and a cathode side catalyst layer 47 is provided between the membrane 49 and the diffusion media layer 46. Likewise, an anode side diffusion media layer 55 is provided on the anode 51A, with an anode side catalyst layer 53 is provided between the membrane 49 and the diffusion media layer 55. The catalyst layers 47 and 53 and the membrane 49 collectively define a membrane electrode assembly or MEA 48.

The diffusion media layers 46 and 55 depicted schematically in FIG. 1A are configured as porous layers that together enable gas transport into and water transport out of the MEA 48. A cathode side bipolar plate 44 is provided on the cathode 51C, with an anode side bipolar plate 40 similarly provided on the anode 51A. Flow channels 42 defined by the bipolar plates 40 and 44 allow for coolant or another suitable heat transfer fluid (not shown) to flow through the fuel cell 24 for the purposes of temperature regulation. A voltage sensor ($S_V$) connected between the cathode 51C and the anode 51A may be configured to measure an individual cell voltage ($V_C$) as part of the method 100, with the respective measured cell voltage ($V_C$) for each of the various fuel cells 24 assembled into the fuel cell stack 22 of FIG. 1 ultimately communicated to the controller 50, either wirelessly or over individual circuit traces or transfer conductors (not shown). Alternatively, the cell voltages ($V_C$) may not be individually measured, but rather an average voltage of the fuel cell stack 22 may be used.

As shown in FIG. 1, a current sensor ($S_I$) and multiple temperature sensors ($S_T$) may also be used to respectively measure a current level and temperature of the fuel cells 24, with such values ultimately used in the control of the fuel cell system 20, as well as to calculate a current density (j) that is ultimately used in the execution of method 100. The PEM fuel cell system 20 as a whole represents a testing environment for the fuel cell stack 22.

In a hydrogen ($H_2$) embodiment of the fuel cell 24, $H_2$ gas from a fuel source 26 is provided to the anode 51A (see FIG. 1A) of the fuel cell stack 22 via a feed line 31, with the flow of hydrogen gas into the fuel cell stack 22 indicated by arrow $H_2$. Anode exhaust exits the fuel cell stack 22 on an anode exhaust line 35. A compressor 28 provides inlet airflow, and thus oxygen ($O_2$), on a cathode input line 21 to the fuel cell stack 22. Similar to the anode exhaust line 35, cathode exhaust gas is output from the fuel cell stack 22 on a separate cathode exhaust line 33.

The PEM fuel cell system 20 of FIG. 1 includes a thermal management system configured to control the temperature of the fuel cell stack 22. In particular, a coolant pump 39 circulates heat transfer fluid through a thermal loop 37 outside of and through the fuel cell stack 22. A radiator 34 and heater 32 fluidly connected to the thermal loop 37 maintain a desired temperature of the fuel cell stack 22. The temperature sensors ($S_T$) at the inlet and outlet of the fuel cell stack 22 are configured and placed to measure the temperature of the heat transfer fluid at the respective inlet and outlet of the fuel cell stack 22. Although one voltage sensor ($S_V$) is depicted for simplicity, a corresponding voltage sensor ($S_V$) individually measures a corresponding cell voltage for each of the fuel cells 24 in the fuel cell stack 22, i.e., as in FIG. 1A, with one voltage sensor ($S_V$) shown for illustrative simplicity in FIG. 1, and/or a single voltage sensor ($S_V$) may measure an average voltage of the fuel cell stack 22.

Still referring to FIG. 1, the controller 50 receives temperature signals (arrow $T_C$) from the temperature sensors ($S_T$) indicative of the temperature of the heat transfer fluid at the above-noted inlet and outlet of the fuel cell stack 22. The controller 50 also receives the cell voltages (arrow $V_C$) as voltage signals from the voltage sensors ($S_V$), and may also receive a measured stack or cell current (arrow $I_C$). In response, the controller 50 regulates the overall operation of the radiator 34, pump 39, and heater 32. Additionally, the controller 50 is configured to control the speed of the compressor 28 and the flow of hydrogen gas (arrow H2) into the fuel cell stack 22 from the fuel source 26 in controlling the overall operation of the fuel cell stack 22. In this manner, the controller 50 is able to regulate the power level that is output from the fuel cell stack 22.

Outside of the general operational control of the fuel cell stack 22 of FIG. 1, the controller 50 performs the specific MEA break-in/conditioning process embodied as the method 100, ultimately outputting control signals (arrow CC) to regulate the fuel cell stack 22, i.e., temperature, current density, and/or voltage level of the individual fuel cells 24, according to the method 100 as set forth below. In order to perform these functions, the controller 50 includes a processor (P) and memory (M). The memory (M) includes tangible, non-transitory memory, e.g., read only memory, whether optical, magnetic, flash, or otherwise. The controller 50 also includes sufficient amounts of random access memory, electrically-erasable programmable read only memory, and the like, as well as a high-speed clock and counter 11, analog-to-digital and digital-to-analog circuitry, and input/output circuitry and devices, as well as appropriate signal conditioning and buffer circuitry.

Figure 2:
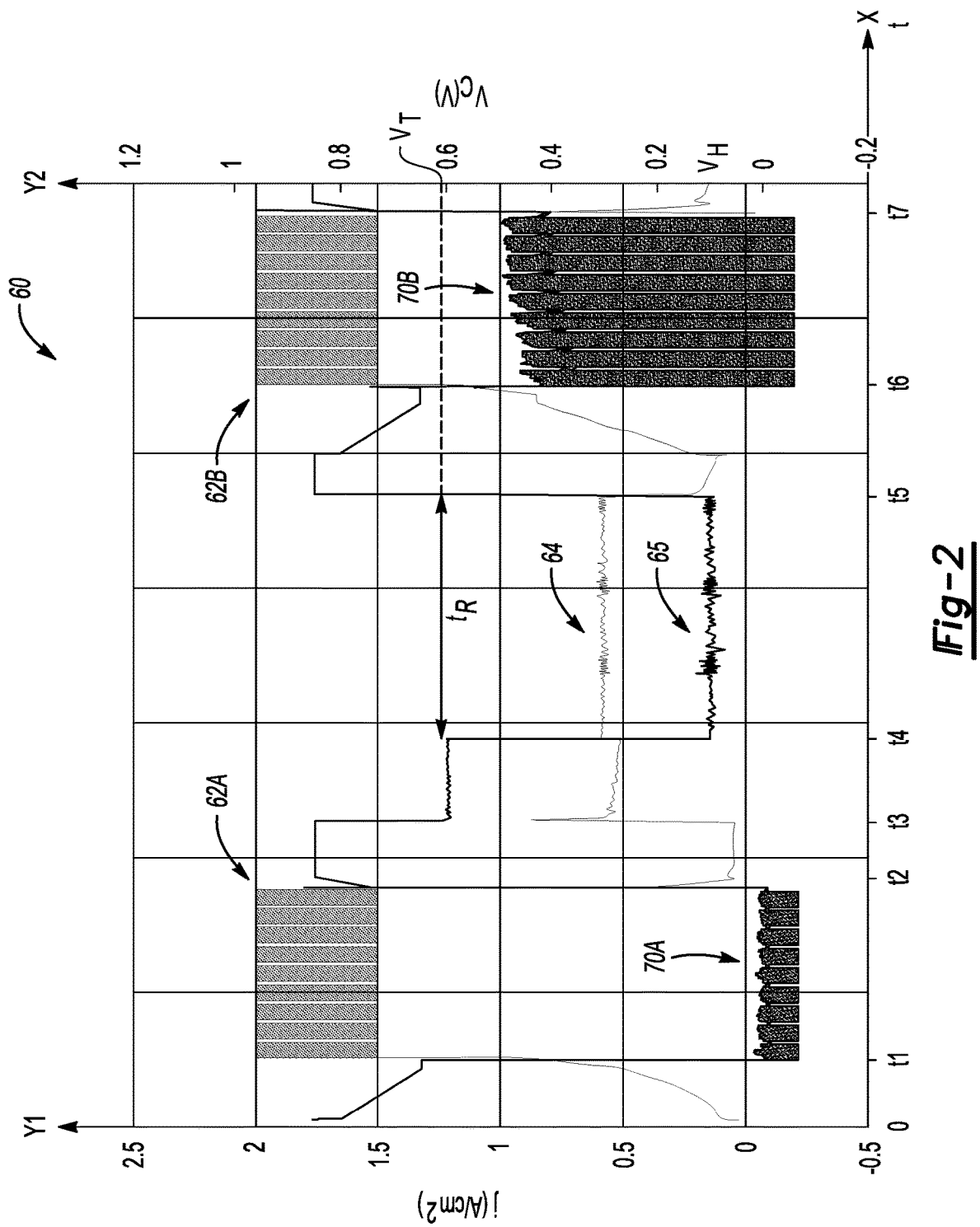
FIG. 2 is a time plot of current density and cell voltage on the vertical Y1- and Y2-axes, respectively, and time of the horizontal X-axis.

FIG. 2 is a current density time plot 60 corresponding to an example embodiment of the method 100 noted above, with a flow chart example of method 100 provided in FIG. 4 and described separately below. In FIG. 2, current density (j) is represented in amps/centimeter squared (A/cm$^2$) and depicted on the Y1-axis, cell voltage ($V_C$) in volts depicted on the Y2-axis, and time (t) depicted on the X-axis. The example multi-stage conditioning methodology illustrated in FIG. 2 alternates first and second load cycling stages 62A and 62B with one or more voltage recovery stages 65 for improved initial power performance. However, the disclosed voltage recovery stages 65 may be used alone, i.e., without alternating with load cycling stages 62A and 62B.

Up to $t_1$ in FIG. 2, the controller 50 of FIG. 1 may control operation of the fuel cell stack 22 such that the current density (j) rises to a first threshold level. The controller 50 then executes the first load cycling stage 62A in which the current density (j) cycles between the first threshold level and a higher second threshold level, doing so for a calibrated number of load cycles. For instance, in a non-limiting example embodiment the first threshold level of current density (j) may be about 1.5 A/cm$^2$, with the second threshold level being 2.0 A/cm$^2$, or about 33 to 50 percent higher than the first threshold level, with 75 to 100 load cycles commanded by the controller 50. Higher or low thresholds, ranges, and/or number of load cycles may be used in different embodiments of the method 100. During the first load cycling stage 62A, the cell voltage ($V_C$) is measured and reported to the controller 50, with a first measured voltage range indicated at 70A and corresponding to the first load cycling stage 62A.

At $t_2$, the controller 50 discontinues the optional first load cycling stage 62A, and as a result, the current density (j) drops to nearly zero between $t_2$ and $t_3$. Commencing at $t_3$, the stack temperature and the hydrogen and/or air/oxygen feed rate into the fuel cell stack 22 are controlled via the controller 50 until the cell voltage ($V_C$) settles to a target voltage ($V_T$), e.g., 0.6 V, at about $t_4$.

At $t_4$, the controller 50 commences a first voltage recovery stage 65 of the conditioning method 100 after the cell voltage ($V_C$) decreases to the above-noted target voltage ($V_T$). The controller 50 thereafter controls operation of the fuel cell stack 22 of FIG. 1 such that the current density (j) and the cell voltage ($V_C$) are held substantially constant at low calibrated levels, e.g., a current density (j) of about 0.6 A/cm$^2$ and a hold voltage ($V_H$) of about 0 to 0.2 V in the illustrated example embodiment. The hold voltage ($V_H$) is sustained for a predetermined voltage hold duration, e.g., 25-35 minutes in an example embodiment. Thus, until about $t_3$ the current density (j) may be closely controlled in a closed-loop manner via the controller 50 to produce the resultant hold voltage ($V_H$).

At $t_5$, the controller 50 may optionally execute the second load cycling stage 62B using the parameters of the first load cycling stage 62A, or using adjusted parameters. As can be seen commencing at $t_6$, the measured cell voltage ($V_C$) in a second measured voltage range indicated at 70B increases relative to the levels shown at 70A during the measured during the first load cycling stage 62A. This change is indicative of positive progress in the break-in/conditioning method 100 as contaminants are dissolved and conditioning has its intended effect on power performance.

The second load cycling stage 62B is maintained until about $t_7$, with the duration $t_6$-$t_7$ being the predetermined or calibrated load cycling duration ($t_R$). The controller 50 may follow the second load cycling stage 62B with a second voltage recovery stage if the cell voltage ($V_C$) has not reached the target voltage ($V_T$) after completion of the second load cycling stage 62B. Thus, as part of the disclosed approach of method 100, the controller 50 may compare the measured cell voltage ($V_C$) to the target voltage ($V_T$) and discontinue the method 100 when the target voltage ($V_T$) is achieved.

Figure 3:
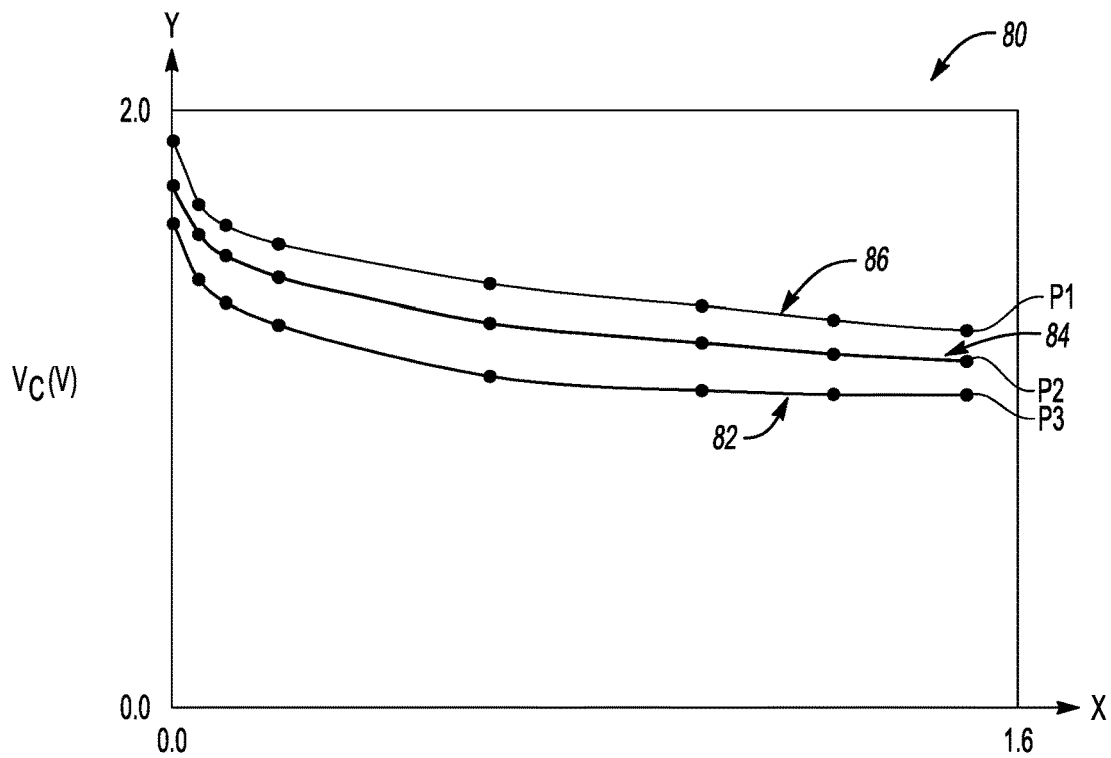
FIG. 3 is an example performance plot of cell voltage on the vertical Y-axis and current density on the horizontal X-axis.

As shown via an example performance plot 80 in FIG. 3, a goal of the conditioning method 100 is to achieve a predetermined initial power capability per fuel cell 24 of the fuel cell stack 22 shown in FIG. 1. Plot 80 depicts the relative effects on the cell voltage ($V_C$) of using different break-in techniques, doing so via comparative traces 82, 84, and 86. Cell voltage ($V_C$) in volts (V) is depicted on the Y-axis, and current density (j) is depicted in A/cm$^2$ on the X-axis. Power density ($P_D$) of a given fuel cell 24 is simply the product of the cell voltage ($V_C$) and the current density (j), i.e., $P_D = V_C \cdot j$. While a range of 0-2V is shown on the Y-axis and 0-1.6 A/cm$^2$ is shown on the X-axis, traces 82, 84, and 86 are intended to be relative, with the actual values of the X-axis and Y-axis varying with the intended application.

As part of the conditioning method 100, a target power density may be set by the controller 50 of FIG. 1 for each fuel cell 24, with electrical parameters to the fuel cell 24 closely controlled during to ultimately raise the cell voltage ($V_C$) to a specific power density, thus ensuring that the fuel cell stack 22 of FIG. 1 can produce the required power when newly commissioned. As contaminants from the fuel cell manufacturing process gradually dissolve, the cell voltage ($V_C$) at a given load should increase as shown in FIG. 3. That is, as cell resistance decreases with the reduction in surface contaminants, the cell voltage ($V_C$) should increase. The graphical depiction of FIG. 3 thus represents the relative improvement in speed of the overall conditioning process when using different break-in techniques.

Trace 82 shows a baseline performance of a fuel cell 24 prior to being subjected to a break-in/conditioning process. Given a representative target cell voltage of at a given current density, an unconditioned fuel cell 24 will have a lower potential at point P3 than the target cell voltage. Typical load/current cycling techniques alone, such as those disclosed in U.S. Pat. No. 9,099,703 to Rapaport et al. which is hereby incorporated by reference in its entirety, produce a noticeably improved conditioning response, as indicated by the elevated voltage at point P2. Given a higher target cell voltage of 600 mV, the break-in process of trace 84 may be extended as indicated by trace 86 with multiple alternating load cycling and voltage recovery stages as shown in FIG. 2. Therefore, the method 100 may be used in circumstances in which it would be advantageous to complete the break-in/conditioning process at a faster rate, to achieve a higher absolute peak performance, and/or to enjoy other performance benefits than may be available using load cycling alone. The faster break-in/conditioning results are illustrated in FIG. 3 as trace 86 and corresponding point P1, indicating that the target cell voltage is achieved earlier in time using method 100 than may be possible using existing approaches.

Figure 4:
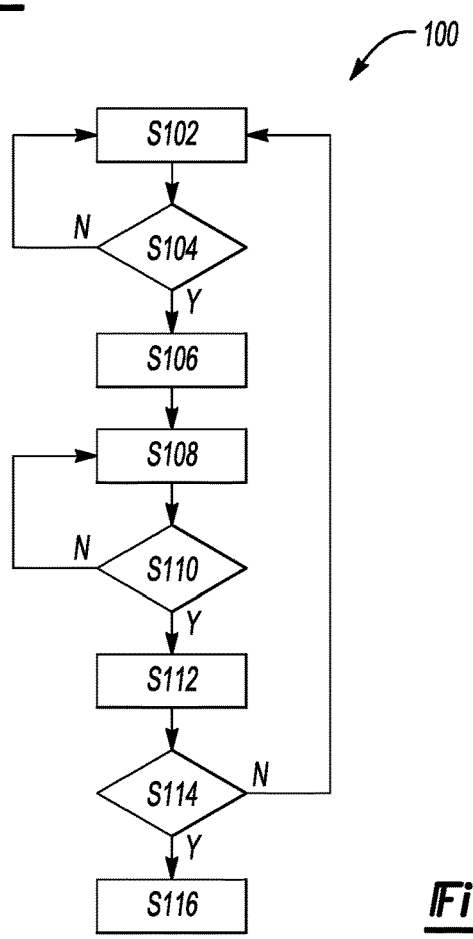
FIG. 4 is a flow chart describing a method for conditioning an MEA prior to use in the PEM fuel cell stack shown in FIG. 1.

An example embodiment of method 100 is shown in FIG. 4. In general, the method 100 first includes humidifying the fuel inlet to the PEM fuel cell stack 22 of FIG. 1 to a relative humidity level of at least 100 percent. Then, in general terms, the controller 50 maintains the current density (j) and cell voltage ($V_C$) of the fuel cell 24 at a calibrated current density level and a calibrated hold voltage level, respectively, for a predetermined voltage recovery duration ($T_R$ of FIG. 2). The cell voltage ($V_C$) is then measured after completing the predetermined voltage recovery duration, with the controller 50 executing a control action with respect to the fuel cell stack 22 responsive to the measured cell voltage ($V_C$) exceeding a target voltage ($V_T$).

In a particular embodiment that begins with step S102, with the fuel cell system 20 of FIG. 1, in a controlled environment in which ambient temperature is about ambient up to about 50° C. and the fuel cell stack 22 is fully humidified at its inlet, i.e., >about 100% relative humidity, the individual fuel cells 24 of the representative fuel cell system 20 are subjected to the break-in/conditioning process as depicted in FIG. 2. The controller 50 may optionally initiate load (current) cycling at step S102 until the current density (j) reaches a first threshold level, with the first threshold level forming a lower bound of a calibrated current density range. In an example embodiment, the first and second threshold levels may be 1.5 A/cm² and 2 A/cm², respectively, although other values and ranges are possible in other configurations. The controller 50 thereafter controls operation of the fuel cell stack 22 for a predetermined number of load cycles. The cell voltage ($V_C$) is measured as a response.

At step S104, the controller 50 may use the counter 11 shown in FIG. 1 to determine whether a predetermined number of load cycles have completed. Steps S102 and S104 are repeated in a loop until the predetermined number of load cycles are completed. The controller 50 thereafter proceeds to step S106.

Optional load cycling is discontinued at step S106. Current density (j) of FIG. 2 drops to nearly zero and the cell voltage ($V_C$) is briefly uncontrolled. Operation of the fuel cell stack 22 is then controlled until the calibrated hold voltage ($V_H$) is attained, with such a voltage ranging from 0 to about 0.4 V. The method 100 proceeds to step S108 once the calibrated hold voltage ($V_H$) is achieved and stable.

At step S108, the controller 50 commences the above-described voltage recovery period. For the entire duration of the voltage recovery period, the current density (j) and the cell voltage ($V_C$) are held substantially constant, as indicated by arrows 64 and 65 in FIG. 2. The duration may be at least 10 minutes per step up to 30 minutes or more in length in some embodiments, and may be intermittent or one continuous duration in other embodiments.

Step S108 is executed in a loop with step S110, with the controller 50 of FIG. 1 in step S110 determining whether the calibrated duration has elapsed. The method 100 proceeds to step S112 when the controller 50 verifies that the calibrated duration for the voltage recovery period is complete.

Step S112 includes measuring the cell voltages ($V_C$) using the respective voltage sensor ($S_V$) for each fuel cell 24, as depicted schematically in FIG. 1A. The measured cell voltages ($V_C$) are then compared at step S114 to a calibrated target cell voltage ($V_T$), e.g., 600-700 mV. If the cell voltages ($V_C$) remain below the calibrated target cell voltage ($V_T$), the method 100 returns to step S102, when optional load cycling is used, or to step S108 when using only voltage recovery, and repeats the relevant steps S102-S112 as explained above. Otherwise, the method 100 proceeds to step S116.

At step S116, the method 100 may include recording a code in memory (M) of the controller 50 shown in FIG. 1 indicating that the fuel cells 24 have been successfully broken in or conditioned. As a result, the fuel cell stack 22 may be approved or validated for use, e.g., in the example vehicle 10 of FIG. 1.

Alternatively to the use of the above-described voltage recovery steps, the load cycling stages may be intermixed with a hydrogen/nitrogen (H2/N2) low-voltage hold process, or such a process may be used alone. In such an embodiment, the voltage recovery stage is executed at a higher temperature of at least 80° C. and includes supplying hydrogen fuel to the anode 51A of the fuel cell 24 shown in FIG. 1A, supplying nitrogen to the cathode 51C of the fuel cell 24, and maintaining the calibrated hold voltage level ($V_H$) to about 0.1 V, i.e., 0 to 0.2 V. Feeding of nitrogen ($N_2$) to the cathode 51C helps to ensure that the cathode 51C is effectively starved of oxygen. The cell voltage ($V_C$) may be uncontrolled in this embodiment, but is typically maintained at the low level of about 0.1 V.

The method 100 described above therefore provides an alternative, faster-acting approach to conditioning of a fuel cell 24 using a membrane electrode assembly or MEA, with the method 100 working at high or low current densities. When used in conjunction with intermittent load cycling, it may be possible to achieve sufficiently higher cell voltages, current densities, and peak performance levels in a shorter period of time relative to existing baseline techniques. The concomitant reduction in manufacturing time and associated costs may facilitate use of the fuel cell stack 22 of FIG. 1 in the vehicle 10 or in a wide variety of other beneficial applications.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations of the described elements and features. The detailed description and the drawings are supportive and descriptive of the present teachings, with the scope of the present teachings defined solely by the claims.

What is claimed is:

1. A method for conditioning a membrane electrode assembly (MEA) in a fuel cell for a fuel cell stack, the method comprising:
humidifying a fuel inlet to the fuel cell stack to a threshold relative humidity level;
controlling, via a controller in a load cycling stage, operation of the fuel cell to cycle a current density of the fuel cell within a calibrated current density range;
controlling, after the load cycling stage via the controller in voltage recovery stage having a predetermined voltage recovery duration, operation of the fuel cell to hold the current density and a cell voltage of the fuel cell substantially constant at a calibrated current density level and a calibrated hold voltage level, respectively;
measuring the cell voltage via a voltage sensor after completing the predetermined voltage recovery duration; and
executing a control action with respect to the fuel cell or fuel cell stack, including:
responsive to the measured cell voltage exceeding a target voltage, recording a diagnostic code in a memory device via the controller indicative of successful conditioning of the MEA, and
responsive to the measured cell voltage not exceeding the target voltage, repeating the load cycling stage and the voltage recovery stage and then determining again if the measured cell voltage exceeds the target voltage.

2. The method of claim 1, wherein the calibrated current density level is in a range of 0.5 to 1 A/cm2 and the calibrated hold voltage level is in a range of 0 to about 0.4 volts.

3. The method of claim 1, wherein the voltage recovery duration is at least 10 minutes in a single continuous step or in multiple steps.

4. The method of claim 3, wherein the voltage recovery duration is in a range of 10-30 minutes in the single continuous step or in the multiple steps.

5. The method of claim 1, wherein the voltage recovery stage includes a plurality of voltage recovery stages, and the load cycling stage includes a plurality of load cycling stages interleaved with the voltage recovery stages.

6. The method of claim 1, wherein the calibrated current density range of the load cycling stage has a lower limit and an upper limit that both exceed the calibrated current density level used during the voltage recovery stage.

7. The method of claim 6, wherein the lower limit is at least twice the calibrated current density level used during the voltage recovery stage.

8. The method of claim 7, wherein the calibrated current density level used during the voltage recovery stage is about 0.6 A/cm2, the lower limit is about 1.5 A/cm2, and the upper limit is about 2 A/cm2.

9. The method of claim 1, wherein the voltage recovery stage is conducted at a temperature in a range of ambient to about 50° C.

10. The method of claim 1, wherein the at least one voltage recovery stage is executed at a temperature of at least about 80° C., and includes:
supplying hydrogen to an anode of the fuel cell;
supplying nitrogen to a cathode of the fuel cell; and
maintaining the cell voltage of the fuel cell at the calibrated hold voltage level of about 0 to 0.2 V.

11. A fuel cell system comprising:
a fuel cell stack having a plurality of fuel cells, each of the fuel cells having a respective membrane electrode assembly (MEA); and
a controller having memory on which is recorded instructions for breaking-in and/or conditioning the MEAs of the respective fuel cells, wherein execution of the instructions causes the controller to:
humidify a fuel inlet to the fuel cell stack to a threshold relative humidity level;
operate each of the fuel cells in a load cycling stage to cycle a respective current density of the fuel cell within a calibrated current density range;
after the load cycling stage, operate each of the fuel cells to maintain the respective current density and a respective cell voltage of each of the fuel cells substantially constant at a calibrated current density level and a calibrated hold voltage level, respectively, using voltage recovery stage having a predetermined voltage recovery duration;
measure the cell voltages of the fuel cells after completing the predetermined voltage recovery duration; and
execute a control action with respect to the fuel cell or fuel cell stack, including:
responsive to the measured cell voltages exceeding a target voltage, recording a diagnostic code indicative of successful conditioning of the MEA, and
responsive to one or more of the measured cell voltages not exceeding the target voltage, repeating the load cycling and voltage recovery stages for each of the fuel cells with the respective measured cell voltage thereof not exceeding the target voltage.

12. The fuel cell system of claim 1, wherein the calibrated current density level is in a range of 0.3 to about 1 A/cm2 and the calibrated hold voltage level is in a range of 0 to about 0.4 volts.

13. The fuel cell system of claim 1, wherein the voltage recovery duration is at least 10 minutes in a single continuous step or in multiple steps.

14. The fuel cell system of claim 13, wherein the voltage recovery duration is in a range of 10-30 minutes in the single continuous step or the multiple steps.

15. The fuel cell system of claim 13, wherein the at least one voltage recovery stage includes a plurality of voltage recovery stages, and the load cycling stage includes a plurality of load cycling stages interleaved with the voltage recovery stages.

16. The fuel cell system of claim 15, wherein the calibrated current density range has a lower limit and an upper limit that both exceed the calibrated current density level used during the at least one voltage recovery stage.

17. The fuel cell system of claim 16, wherein the lower limit of the calibrated current density range is at least twice the calibrated current density level used during the voltage recovery stage.

18. The fuel cell system of claim 17, wherein the calibrated current density level used during the voltage recovery stage is about 0.6 A/cm2, the lower limit is about 1.5 A/cm2, and the upper limit is about 2 A/cm2.

19. The fuel cell system of claim 11, wherein the voltage recovery stage is conducted at a temperature range of ambient to about 50° C.

20. The fuel cell system of claim 11, wherein the voltage recovery stage is executed at a temperature of at least about 80° C., and includes instructions that cause the controller to:
supply hydrogen to an anode of the fuel cell;
supply nitrogen to a cathode of the fuel cell; and
maintain the calibrated hold voltage level to about 0 to 0.2 V.

* * * * *